United States Patent [19]
Kita et al.

[11] Patent Number: 5,331,440
[45] Date of Patent: Jul. 19, 1994

[54] COLOR IMAGE PROCESSING METHOD AND APPARATUS CAPABLE OF PROPERLY DETERMINING BLACK QUANTITY

[75] Inventors: Shinji Kita; Hitoshi Ogatsu, both of Kanagawa, Japan

[73] Assignee: Fuji Xerox Co., Ltd., Tokyo, Japan

[21] Appl. No.: 44,171

[22] Filed: Apr. 8, 1993

[30] Foreign Application Priority Data

Apr. 10, 1992 [JP] Japan .................................. 4-118420

[51] Int. Cl.$^5$ ............................................. H04N 1/46
[52] U.S. Cl. .................................... 358/529; 358/530
[58] Field of Search ............................. 358/518–520, 358/523, 529–530, 539

[56] References Cited

U.S. PATENT DOCUMENTS

| | | | |
|---|---|---|---|
| 4,614,967 | 9/1986 | Sayanagi | 358/529 |
| 4,682,216 | 7/1987 | Sasaki et al. | 358/529 |
| 4,985,759 | 1/1991 | Ito | 358/529 |
| 5,008,742 | 4/1991 | Shigaki et al. | 358/529 |
| 5,031,034 | 7/1991 | Shimizu et al. | 358/529 |

*Primary Examiner*—Stephen Brinich
*Attorney, Agent, or Firm*—Finnegan, Henderson Farabow, Garrett & Dunner

[57] ABSTRACT

Three input color separation signals are converted to three color signals on a uniform color space. A black quantity to be used for full-black reproduction is determined as the maximum black quantity of an output black signal. Then, an actual black quantity of the output black signal is determined based on the maximum black quantity and a chroma signal obtained from the uniform color signals. Finally, color quantities of respective output color signals other than the output black signal are determined based on the uniform color signals and the actual black quantity thus determined.

14 Claims, 9 Drawing Sheets

**{K, L*, a*, b*} COORDINATE SPACE**

```
k1  , L1 , a1 , b1
k1  , L1 , a1 , b2
 ⋮
k1  , L2p, a2q, b1
k2  , L1 , a1 , b2
k2  , L1 , a1 , b2
 ⋮
km  , L2p, a2q, b1
km+1, L1 , a1 , b2
km+1, L1 , a1 , b2
 ⋮
k2w , L2p, a2q, b2r-2
k2w , L2p, a2q, b2r-1
k2w , L2p, a2q, b2r
```

$p=q=r=w=3, P\{C\}=P\{M\}=P\{Y\}=2^6$

{C, M, Y} COORDINATE SPACE

```
P1         {C}
P2         {C}
 ⋮
P2pqr      {C}
P2pqr+1    {C}
P2pqr+2    {C}
 ⋮
P2pqr*m    {C}
P2pqr*m+1  {C}
P2pqr*m+2  {C}
 ⋮
P2pqrw-2   {C}
P2pqrw-1   {C}
P2pqrw     {C}
```

```
P1         {M}
P2         {M}
 ⋮
P2pqr      {M}
P2pqr+1    {M}
P2pqr+2    {M}
 ⋮
P2pqr*m    {M}
P2pqr*m+1  {M}
P2pqr*m+2  {M}
 ⋮
P2pqrw-2   {M}
P2pqrw-1   {M}
P2pqrw     {M}
```

```
P1          {Y}
P2          {Y}
 ⋮
P2pqr       {Y}
P2pqr+1     {Y}
P2pqr+2     {Y}
 ⋮
P2pqr*m     {Y}
P2pqr*m+1   {Y}
P2pqr*m+2   {Y}
 ⋮
P2pqrw-2    {Y}
P2pqrw-1    {Y}
P2pqrw      {Y}
```

| 3bit K | 3bit L* | 3bit a* | 3bit b* | 6bit P{C} |
|---|---|---|---|---|
| 3bit K | 3bit L* | 3bit a* | 3bit b* | 6bit P{M} |
| 3bit K | 3bit L* | 3bit a* | 3bit b* | 6bit P{Y} |

⟨12bit Address⟩   ⟨6bit CONTENT⟩

COLOR IMAGE PROCESSING METHOD AND APPARATUS CAPABLE OF PROPERLY DETERMINING BLACK QUANTITY

BACKGROUND OF THE INVENTION

The present invention relates to a color image processing method and apparatus for converting three color signals read by an image input device to color image recording signals of a plurality of colors including black. More specifically, the invention relates to a color image processing apparatus for determining a black signal and what is called an under color removal quantity in the image recording signals.

In the printing technologies, a color original image is usually recorded or reproduced by 4-color printing. That is, the printing is performed using color separation printing patterns for printing inks of yellow, magenta, cyan and black. This is due to the fact that three-color printing of yellow, magenta and cyan cannot produce reproduction images having sufficient contrast performance because, for instance, the inks do not have an ideal color development characteristic.

In some cases of the 4-color printing, the printing inks of yellow, magenta and cyan are subjected to what is called 100% under color removal, in which an image is reproduced using black ink and two of yellow, magenta and cyan inks. This technique has advantages that the color reproduction range is broadened in low lightness portions and gray stability is kept high in high lightness portions. Further, the under color removal serves to reduce consumption amounts of expensive color inks, to thereby lower the running costs.

Although the various advantages can be obtained by performing the under color removal in the 4-color printing, it is very difficult to determine the under color removal quantity and the black quantity in accordance with the input image signals. In general, since black ink has a higher contrast than the other inks, it likely enhances roughness of an image and therefore it is not appropriate to include a large quantity of black ink in human skin portions in an image. Further, the black quantity in character images needs to be larger than in photograph image, to increase the sharpness of characters.

Various techniques of determining the under color removal quantity and the black quantity in a printing color scanner are disclosed in Japanese Patent Application Unexamined Publication Nos. Sho. 57-173838, Sho. 58-190951, Sho. 58-211757, etc.

In the publication Sho. 57-173838, the under color removal is performed separately in chromatic color areas and in achromatic color areas. Achromatic color portions are reproduced only by black ink, and the black quantity is gradually changed in a transition area from an achromatic area to a chromatic area.

The publications Sho. 58-190951 and Sho. 58-211757 disclose techniques for determining the black quantity and the under color removal quantity in accordance with gradation levels of an input image. According to this technique, complete achromatic printing is performed up to a gray level corresponding to the over color of black ink used, and quantities of color inks are increased continuously in shadow areas having a gray level higher than the above level. That is, gray portions having a density within a range reproducible by black ink is reproduced only by black ink, and gray portions whose density exceeds the above range are reproduced using the same quantities of the other three color inks.

Further, techniques of determining the under color removal quantity and the black quantity in digital color recording technologies such as ink jet printing, thermal transfer recording and laser color xerography are disclosed in Japanese Patent Application Unexamined Publication Nos. Sho. 59-161981, Sho. 59-163973, etc. The publication Sho. 59-161981 describes an under color removal technique in which the black quantity is obtained by multiplying the minimum value of three color signals of yellow, magenta and cyan by a certain constant and subtracting the black quantity from the respective color signals. In the publication Sho. 59-163973, two color inks to be combined with black ink are determined from spectral reflectances of a plurality of inks, and the recording is performed such that the color inks and the black ink do not overlap each other. This technique can determine the black quantity and the under color removal quantity by a simple calculation.

Figure 6:
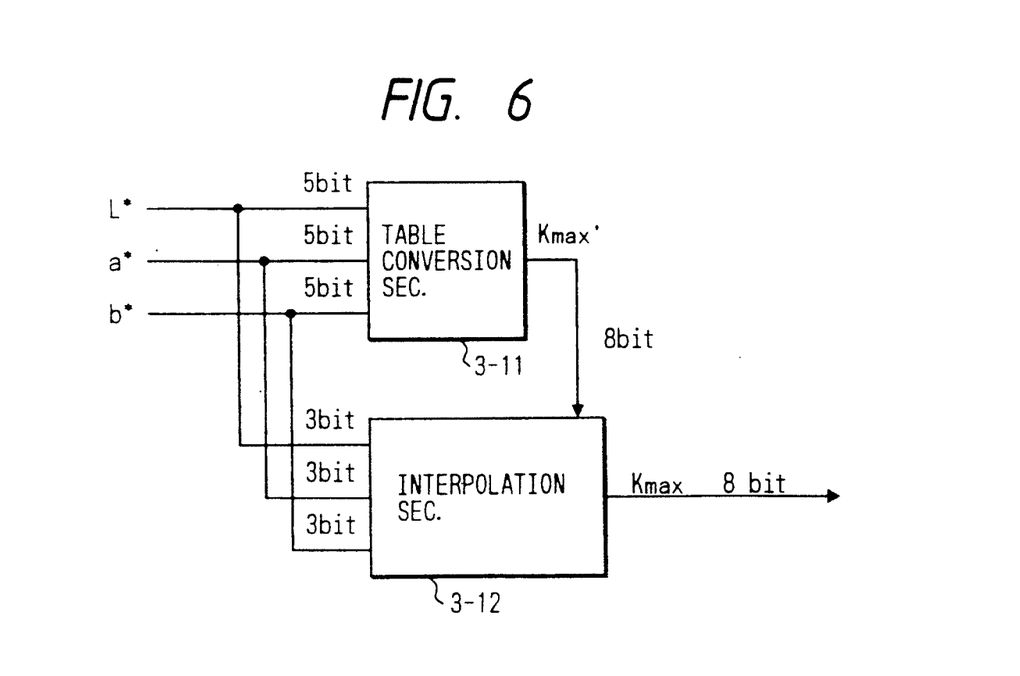
FIG. 6 is a block diagram showing another example of the full-black color conversion means.

Further, Japanese Patent Application Unexamined Publication No. Hei. 4-31859 discloses a color image processing method for determining a dot area ratio that is a parameter used for reproducing an input target color by yellow, magenta cyan and black. In this method, a maximum black area ratio is first determined, and then multiplied by a black ratio that has been determined only from a lightness signal, to determine a final dot area ratio of black. Then, dot area ratios of yellow, magenta and cyan are determined with the final dot area ratio fixed. That is, as shown in FIG. 6 of this publication, the black ratio is reduced for portions having a large lightness value and is increased for portions having a small lightness value. As a result, the target color can be reproduced more faithfully in areas having a low lightness, i.e., in dark areas.

However, in the technique of the publication Sho. 57-173838, many adjustment coefficients are needed in determining the black quantity and the under color removal quantity. Since the coefficients can be determined only empirically, the difficulty in determining the black quantity and the under color removal quantity still remains unsolved.

Since the publications Sho. 58-190951 and Sho. 58-211757 address only the processing on gray portions, a color quasi-outline, i.e., a chroma gap may occur in a transition area from an achromatic area to a chromatic area, i.e., in an image in which the chroma gradually varies (such as a usual color picture/pattern).

The technique of the publication Sho. 59-161981, which is generally called "constant ratio under color removal/addition," has a problem that it cannot perform correct color reproduction. The reasons are described, for instance, in "Considerations (I) on black inclusion in printing," Proceedings of 1st Joint Conference on Color Technologies, four optics societies, 1984, pp. 1-7.

In the publication Sho. 59-163973, since the calculation is based on the principles of the average additive mixture, it cannot perform correct color reproduction in actual recording. This problem originates from the light penetration and diffusion into a sheet, as described, for instance, in J.A.C. Yule, "Principles of color reproduction," Publication department of printing society, 1971, pp. 247-248.

Further, in the publication Hei. 4-31859, the black ratio is determined only based on the lightness signal, and no consideration is made of accommodating a variation of chroma. If the technique of this publication is used without modification in reproducing an image having a chroma variation, characters could not be expressed clearly with a small black ratio in bright areas and transition from a chromatic area to an achromatic area would become somewhat unnatural in dark areas because of a sudden increase of the black ratio. Specifically, satisfactory reproduction performance could not be obtained for an image in which pictures and characters are mixed.

SUMMARY OF THE INVENTION

An object of the present invention is to provide a color image processing method and apparatus which can produce, even in response to an input picture-/character-mixed image, an output image that is free from impurities and has sharp edges, without the need of empirical parameter adjustments.

Another object of the invention is to provide a color image processing method and apparatus which can perform correct color reproduction by a simple calculation without the need of empirical parameter adjustments, and which can perform black addition and under color removal without causing an unnatural chroma gap between an achromatic area and a chromatic area.

Another object of the invention is to provide a color image processing method and apparatus which can perform black addition and under color removal in a device-independent manner, i.e., independently of the types of image recording (printing, ink jet printing, thermal transfer recording, laser xerography, etc.)

A further object of the invention is to provide a color image processing method and apparatus which can reduce image roughness for photographic images and can improve the quality of black characters for character images by improving matching with processing steps other than image reproduction.

According to the invention, a color image processing method for generating output color signals of black and second three colors from input color separation signals of first three colors representing an input image, comprises the steps of:

converting the input color separation signals of the first three colors to uniform color signals of three variables on a uniform color space;

determining a first black quantity to be used for substantially converting the uniform color signals of three variables to color signals of black and two of the first three colors, the first black quantity being a maximum black quantity of the output black signal;

determining a second black quantity based on the first black quantity and a chroma signal obtained from the uniform color signals of three variables, the second black quantity being actually used in the output black signal; and determining color quantities of the respective output color signals of the second three colors based on the uniform color signals of three variables and the second black quantity.

The second black quantity may be determined further based on adjustment information including a mode of the input image and a representative color.

In the invention, the three color separation signals (provided from a color image input device) are converted to the iso-perceptual lightness/chromaticity separation signals, for example, 1976 CIE L*a*b* signals. By performing the black addition and the under color removal using this type of signals, it becomes possible to realize the process compatible with the human perception, and to generalize the process to one that is independent of characteristics of image output devices.

Then, the black quantity is determined from the lightness/chromaticity separation signals for the full-black reproduction, for instance, for the case of faithfully reproducing the L*a*b* signals using black and two of yellow, magenta and cyan. Since this is a 3-input-3-output calculation, the output signals are uniquely determined, in contrast to the conventional case of generating output color signals of four colors including black from input color signals of three colors. The black quantity thus determined means the maximum black quantity that can be set to faithfully reproduce an input color, and defines the black quantity range that can be set in the case of the four-color reproduction. The maximum black quantity may be determined using a table from the 3-variable color signals on the uniform color space as the lightness/chromaticity separation signals. Alternatively, the black quantity may be determined by calculations such that several sets of color conversion coefficients are prepared in advance for respective divided chromaticity regions, color conversions to black and the two colors are performed in a parallel manner using the several sets of coefficients, and the black quantity after the color conversion that provides positive output signals of the two colors is finally selected.

The actual black quantity is determined within the variable range mainly based on the factors other than the color reproduction. For example, the black quantity adjusting coefficient is controlled in accordance with the chroma or hue of the input color to mainly prevent image roughness as occurs when black is included in an intermediate chroma range of the storage color such as a skin color, green of grass or blue of the sky. The black quantity adjusting coefficient is also controlled based on the result of the judgment of whether the input image is a photographic image or a character image. Since the quality of black characters is important for character images, the black quantity is set at a large value within its variable range to increase the black ratios with respect to yellow, magenta and cyan. That is, the reproduction range when using only black is enlarged. As a result, it becomes possible to reduce the deterioration of black character quality due to misregistration in an image output device or a deviation between the three color signals in an image input device.

The black output signal is first determined as a product of the black quantity adjusting coefficient determined based on the factors other than the color reproduction and the maximum black quantity uniquely determined from the point of faithful color reproduction.

Then, the output color signals of yellow, magenta and cyan are determined from the black output signal and the L*a*b* signals representing the input color. Since the black output signal is already determined, the 3-input-3-output calculation is performed to uniquely determine the output signals of three colors, like the calculation described above.

With the above operations, the output signals of four colors including black can provide faithful colorimetric reproduction of the input color in contrast to the conventional case where since the black addition and the under color removal are performed after the determination of the output signals of three colors the input color is not reproduced faithfully depending on the proportion among the output signals.

DESCRIPTION OF THE PREFERRED EMBODIMENT

An embodiment of the present invention are described hereinafter with reference to the accompanying drawings.

Figure 1:
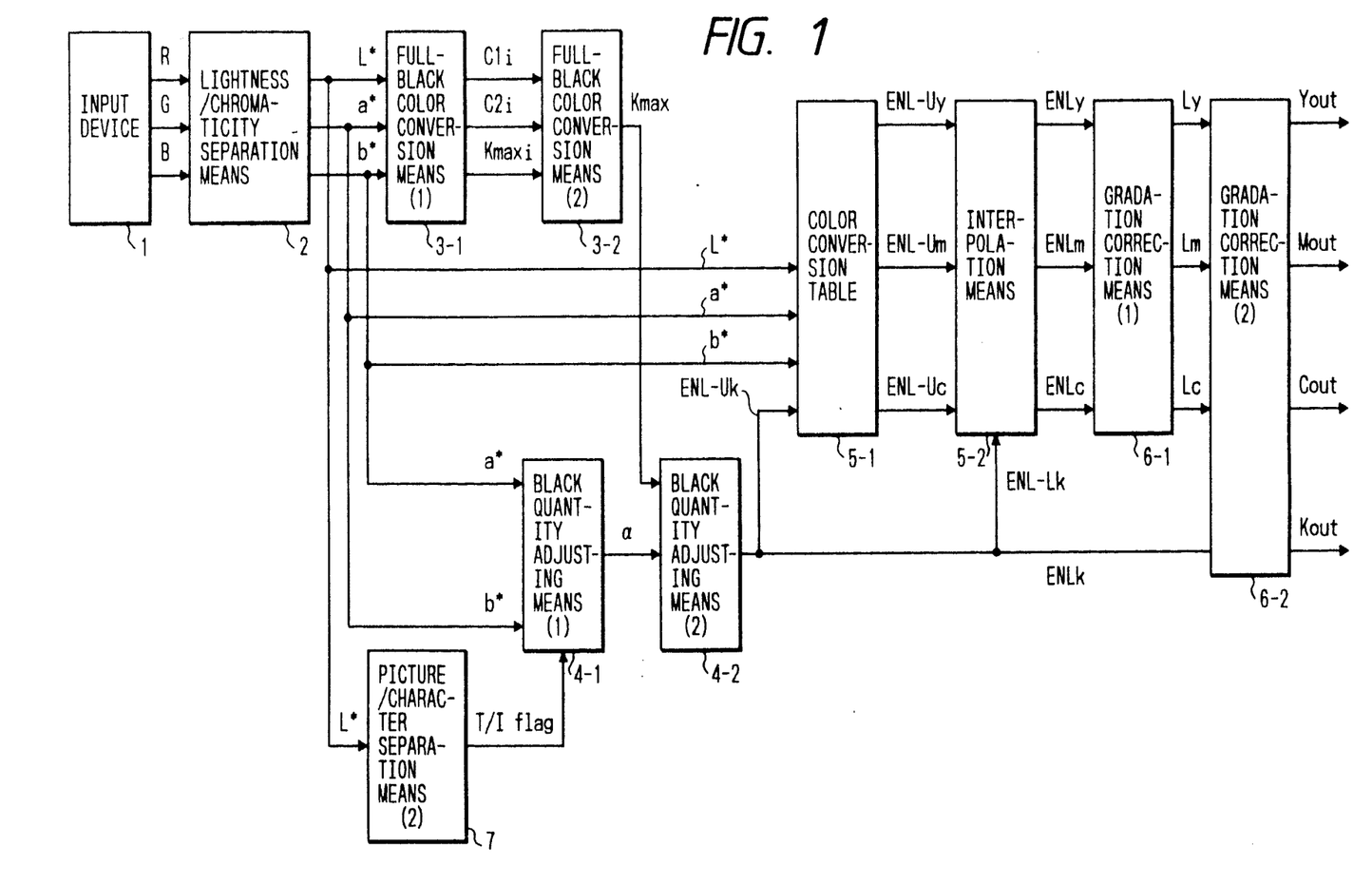
FIG. 1 is a block diagram showing a color image processing apparatus according to an embodiment of the invention.

FIG. 1 shows the constitution of a color image processing apparatus according to an embodiment of the invention. In FIG. 1, a color image input device 1 reads document information while decomposing it into three-color components. The document information thus read is converted to a digital signal by an A/D converter (not shown, incorporated in the input device 1), and output from the input device 1 as three color signals R, G and B in a parallel manner. The color signals R, G and B are converted by an equivalent neutral lightness conversion circuit (not shown) to equivalent neutral lightness signals $R_E$, $G_E$ and $B_E$, which are input to a lightness/chromaticity separation means 2.

The lightness/chromaticity separation means 2 is a means for converting the signals $R_E$, $G_E$ and $B_E$ to signals on a coordinate system which is "iso-perceptive" (a distance between two points on a coordinate system is proportional to a perceptual color difference) and device-independent. Since the 1976 CIE $L^*a^*b^*$ system is appropriate as such a coordinate space, this color representation system is employed in the following description.

A simple method of converting the $\{R_E, G_E, B_E\}$ signals to the $\{L^*, a^* b^*\}$ signals is to utilize the conventional nonlinear masking technique. In this method, the coordinate system conversion is approximated by such a higher-order polynomial as minimizes errors and is performed using the polynomial. The conversion according to the nonlinear masking technique is represented by the following general formulae:

$$b^* = \Psi_l(R_E, G_E, B_E)$$

$$a^* = \Psi_a(R_E, G_E, B_E) \quad (1)$$

$$b^* = \Psi_b(R_E, G_E, B_E)$$

However, in the above method, since general formulae (1) are approximated based on experimental data for, for instance, $3^N$ pairs of $\{R_E^i, G_E^i, B_E^i\}$ and $\{L^{*i}, a^{*i}, b^{*i}\}$ where $i=1, \ldots, N$, the magnitude of local errors depends on the isoperceptiveness of the experimental data. To solve this problem, the direct look-up table technique can be used as disclosed in, for instance, Japanese Patent Application Unexamined Publication Nos. Hei. 1-176561, Hei. 1-159251, Hei. 1-234251, Hei. 1-235642 and Hei. 2-023776. According to these methods, the relationship between the above pairs of experimental data is represented by a table having the data $\{R_E^i, G_E^i, B_E^i\}$ as addresses and $\{L^{*i}, a^{*i}, b^{*i}\}$ as contents.

Further, a calculation for the interpolation between the lattice points is performed using correction coefficients that are different for the respective lattice points. For example, a certain point $\{R_E^0, G_E^0, B_E^0\}$ on the input signal coordinate system is converted to a point $\{L^{*0}, a^{*0}, b^{*0}\}$ after the interpolation such that:

$$L^{*0} = \alpha_l^i(R_E^0 - R_E^i) + \beta_l^i(G_E^0 - G_E^i) + \gamma_l^i(B_E^0 - B_E^i) + L^{*i}$$

$$a^{*0} = \alpha_a^i(R_E^0 - R_E^i) + \beta_a^i(G_E^0 - G_E^i) + \gamma_a^i(B_E^0 - B_E^i) + a^{*i}$$

$$L^{*0} = \alpha_b^i(R_E^0 - R_E^i) + \beta_b^i(G_E^0 - G_E^i) + \gamma_b^i(B_E^0 - B_E^i) + b^{*i} \quad (2)$$

where $$\alpha_l^i = (L^{*i+1} - L^{*i})/(R_E^{i+1} - R_E^i)$$

$$\alpha_a^i = (a^{*i})/(R_E^{i+1} - R_E^i)$$

$$\alpha_b^i = (b^{*i+1} - b^{*i})/(R_E^{i+1} - R_E^i)$$

$$\beta_l^i = (L^{*i+1} - L^{*i})/(G_E^{i+1} - G_E^i)$$

$$\beta_a^i = (a^{*i+1} - a^{*i})/(G_E^{i+1} - G_E^i)$$

$$\beta_b^i = (b^{*i+1} - b^{*i})/(G_E^{i+1} - G_E^i)$$

$$\gamma_l^i = (L^{*i+1} - L^{*i})/(B_E^{i+1} - B_E^i)$$

$$\gamma_a^i = (a^{*i+1} - a^{*i})/(B_E^{i+1} - B_E^i)$$

$$\gamma_b^i = (b^{*i+1} - b^{*i})/(B_E^{i+1} - B_E^i) \quad (3)$$

Since the correction coefficients $\alpha$, $\beta$ and $\gamma$ are known from the lattice point data, a direct look-up table may be constructed by using $\{R_E^i, G^{Di}, B_E^i\}$ as addresses and $\{L^{*i}, a^{*i}, b^{*i}, \alpha_a^i, \alpha_a^i, \alpha_b^i, \beta_l^i, \beta_a^i, \beta_b^i, \gamma_l^i, \gamma_a^i, \gamma_b^i\}$ as contents. In this case, an interpolation-inclusive conversion calculation can be performed to thereby reduce local errors from those of the case utilizing the nonlinear masking technique.

The $\{L^*, a^*, b^*\}$ signals output from the lightness/chromaticity separation means 2 is input to a full-black color conversion means 3, which consists of a first means 3-1 for converting, in a parallel manner, the $\{L^*, a^*, b^*\}$ signals to signals of black and two of yellow, magenta and cyan, and a second means 3-2 for selecting a true black quantity from the calculation results of the first means 3-1.

Figure 2:
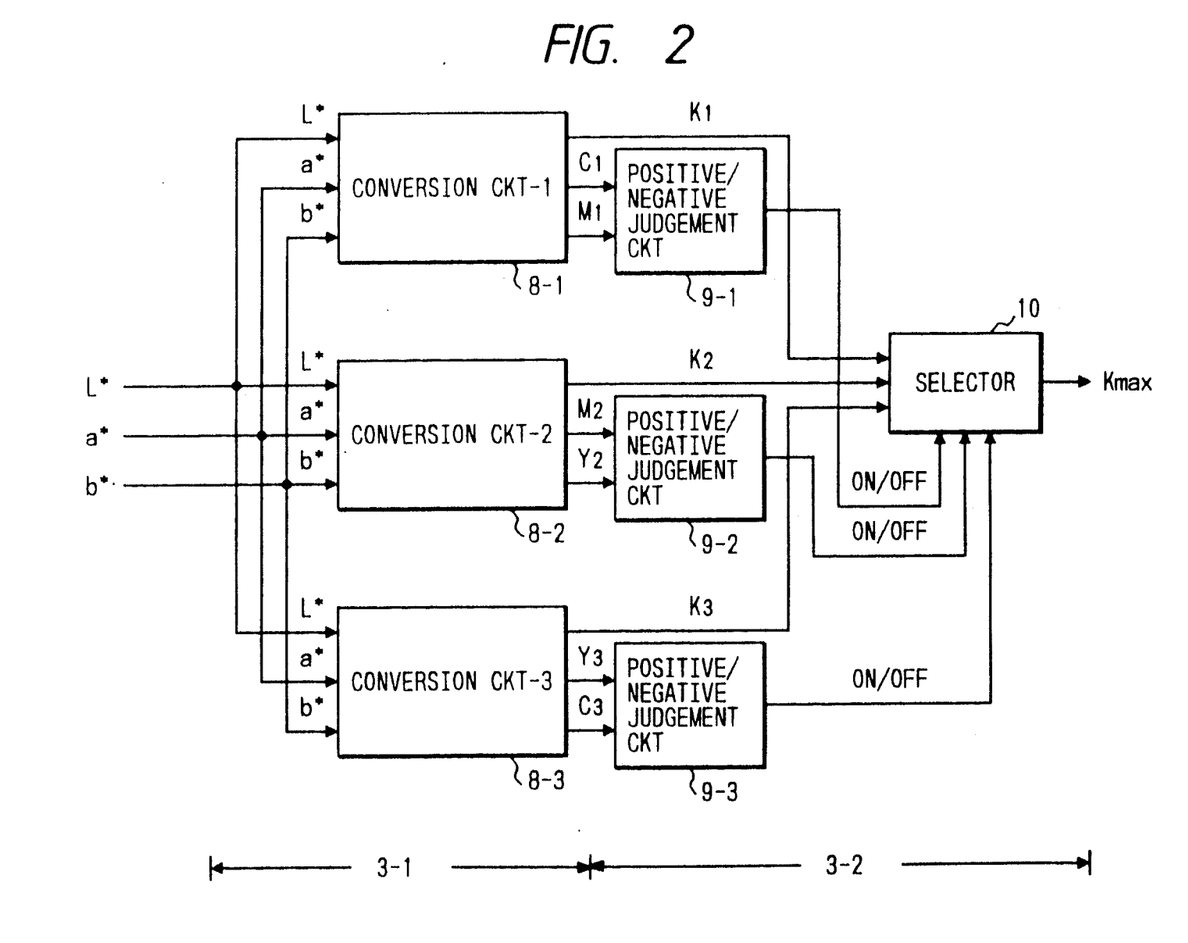
FIG. 2 is a block diagram showing an example of a full-black color conversion means.

Referring to FIG. 2, an example of the full-black color conversion means 3 is described below. The first means 3-1 consists of three conversion circuits 8-1 to 8-3 for converting the $\{L^*, a^*, b^*\}$ signals to signals of black and two of yellow, magenta and cyan. This conversion may be performed, for instance, according to a linear masking method. In this case, the conversion circuits 8-1 to 8-3 perform the following calculation using preset masking coefficients $t^i_{11}$–$t^i_{33}$:

$$C_1^i = t^i_{11}L^* + t^i_{12}a^* + t^i_{13}b^*$$

$$C_2^i = t^i_{21}L^* + t^i_{22}a^* + t^i_{23}b^* \quad (4)$$

$$K^i = t^i_{31}L^* + t^i_{32}a^* + t^i_{33}b$$

where $i = 1, 2, 3$. In equations (4), $C_1^i$ and $C_2^i$ represent color signals output from the conversion circuits 8-1 to 8-3. For example, the conversion circuit 8-1 outputs a cyan signal $C_1^1$ and a magenta signal $C_2^1$, the conversion circuit 8-2 outputs a magenta signal $C_1^2$ and a yellow signal $C_2^2$, and the conversion circuit 8 3 outputs a yellow signal $C_1^3$ and a cyan signal $C_2^3$. On the other hand, black signals $K^i$ are output from the respective conversion circuits 8-1 to 8-3.

The second means 3-2 consists of a positive/negative judgment circuits 9-1 to 9-3 for performing a judgment on the signs of $C_1^i$ and $C_2^i$ output from the respective conversion circuits 8-1 to 8-3, and a selector 10 for outputting one of the black signals $K^i$ provided from the conversion circuits 8-1 to 8-3 based on judgment results of the positive/negative judgment circuits 9-1 to 9-3. The positive/negative judgment circuits 9-1 to 9-3 output an OFF signal when at least one of $C_1^i$ and $C_2^i$ is negative, and outputs an ON signal when both of $C_1^i$ and $C_2^i$ are positive. Detecting the ON/OFF signals from the positive/negative judgment circuits 9-1 to 9-3, the selector 10 outputs the black signal $K^i$ corresponding to the input port that has received the ON signal. Thus, a black quantity $K_{max}$ to be used for reproducing the input image signals $\{L^*, a^*, b^*\}$ using black and two of yellow, magenta and cyan (full-black reproduction) is obtained. The black quantity $K_{max}$ represents an upper limit that can be set in faithfully reproducing the input image signals by yellow, magenta, cyan and black.

Figure 3:
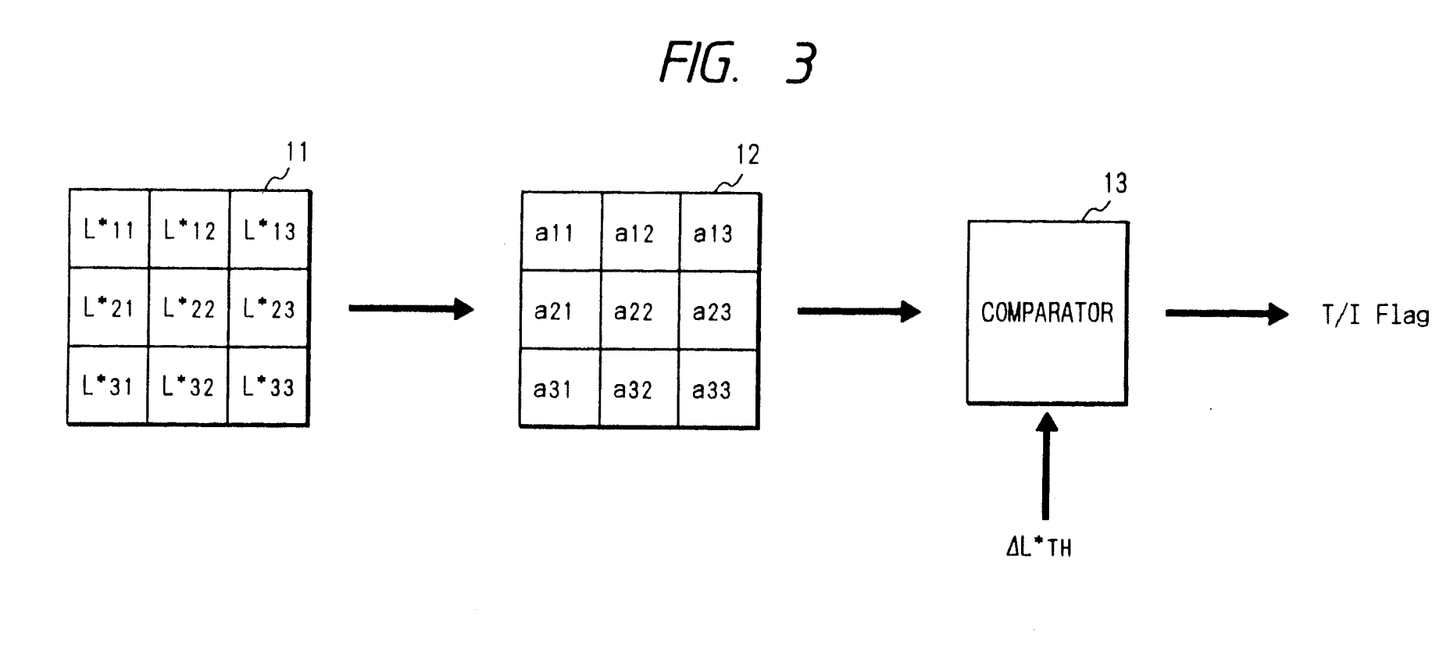
FIG. 3 illustrates constitution of a picture/character separation means.
Figure 4:
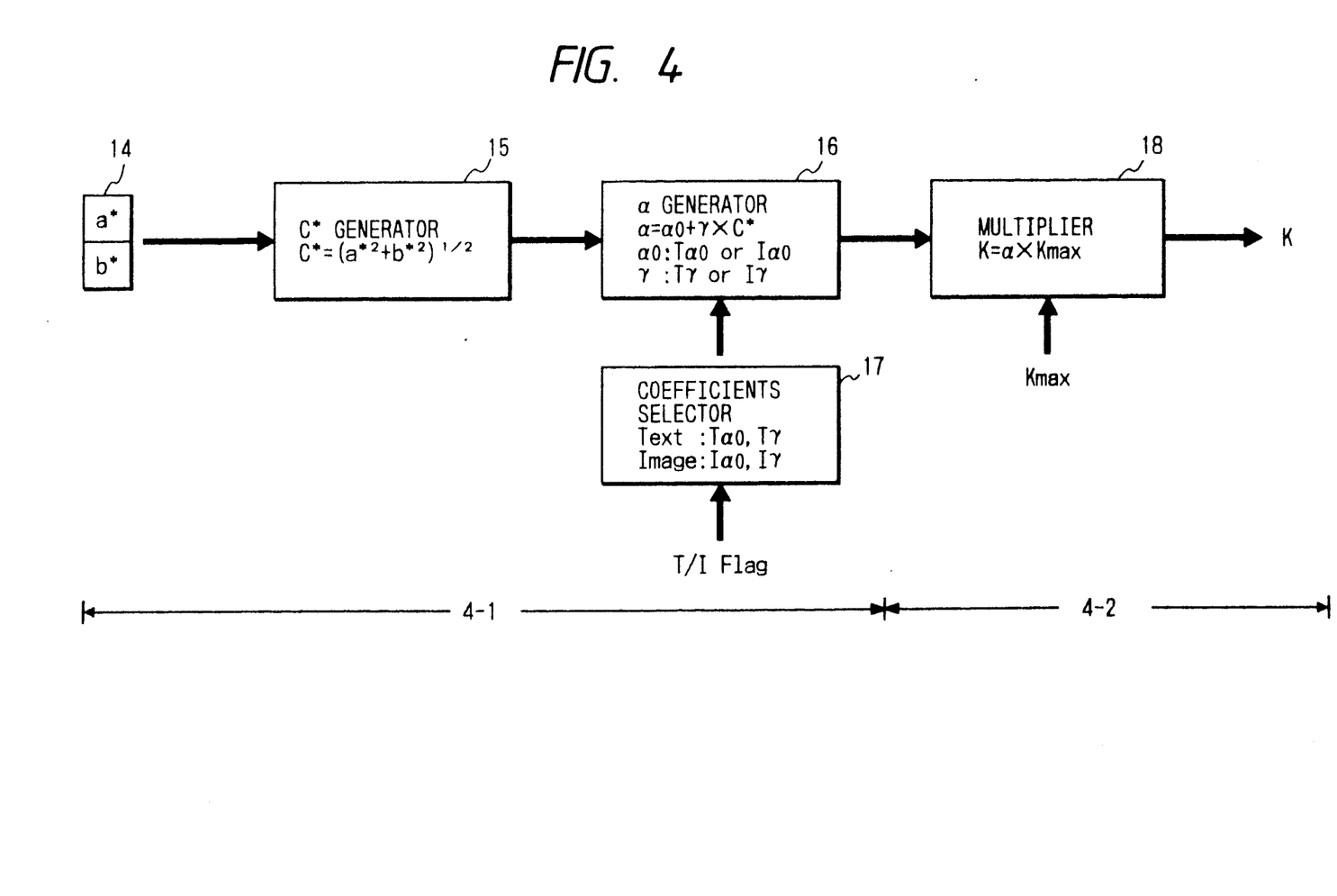
FIG. 4 is a block diagram showing a black quantity adjusting means.

Returning to FIG. 1, the $\{L^*, a^*, b^*\}$ signals output from the lightness/chromaticity separation means 2 are also provided to a picture/character separation means 7 and a black quantity adjusting means 4 to determine a black quantity adjusting coefficient $\alpha$. By comparing a lightness signal value of a pixel under attention with lightness signal values of adjacent pixels that are stored in a line memory (not shown), the picture/character separation means 7 produces a judgment result (image mode information) indicating whether the pixel under attention belongs to a picture portion or a character portion. The black quantity adjusting means 4 produces the black quantity adjusting coefficient $\alpha$ based on a chromaticity signal value of the pixel under attention and the judgment result of the picture/character separation means 7. Referring to FIGS. 3 and 4, an example of the picture/character separation means 7 is described below.

FIG. 3 is a conceptual diagram showing an example of the picture/character separation means 7. A 3×3-block of image lightness signal values 11 consist of a lightness signal value $L^*_{22}$ of a pixel under attention and lightness signal values $L^*_{11}$–$L^*_{33}$ of adjacent pixels that are stored in the line memory (not shown). A convolution is taken between the image lightness signal values 11 and 3×3-block coefficients of an edge detection filter 12:

$$\Delta L^* = \left| \sum_{i,j} a_{ij} L^*_{ij} \right| \quad (5)$$

where $$\sum_{i,j} a_{ij} = 0, \; a_{22} > 0, \; a_{ij} < 0 \; (i,j \neq 2).$$

$\Delta L^*$ in equation (5) is so set as to take a small value when a lightness variation within the block is small, and to take a large value when it is large. The coefficients $a_{ij}$ of the edge detection filter 12 may be those of an ordinary Laplacian filter. A comparator 13 compares $\Delta L^*$ with a preset threshold $\Delta L^*_{th}$. If $\Delta L^* \geq \Delta L^*_{th}$, the pixel under attention is judged to belong to a character portion. If $\Delta L^* < \Delta L^*_{th}$, it is judged to belong to a picture portion. The comparison result is provided to the black quantity adjusting means 4.

FIG. 4 shows an example of the black quantity adjusting means 4. A chroma generator 15 generates a 1976 CIE $L^*a^*b^*$ metric chroma signal $C^*$ $(=(a^{*2}+b^{*2})^{\frac{1}{2}})$ from the $\{a^*, b^*\}$ signals provided from the lightness/chromaticity separation means 2. A black quantity adjusting coefficient generator 16 calculates the black quantity adjusting coefficient $\alpha$ according to the following equation based on the chroma signal $C^*$ and coefficients $\alpha_0$ and $\gamma$ provided from a coefficients selector 17:

$$\alpha = \alpha_0 + \gamma \cdot C^* \quad (6)$$

Having two sets of coefficients $\{T_{\alpha 0}, T_\gamma\}$ and $\{I_{\alpha 0}, I_\gamma\}$, the coefficients selector 17 selects one of the two sets based on the judgment result (T/I flag) sent from the picture/character (or image/text) separation means 7, and provides the selected coefficients to the black quantity adjusting coefficient generator 16. A multiplier 18 calculates a black quantity signal K for actual use based on the black quantity adjusting coefficient $\alpha$ and the black quantity $K_{max}$ provided from the full-black color conversion means 3 ($K = \alpha \cdot K_{max}$), and outputs the calculated signal K.

Figure 5:
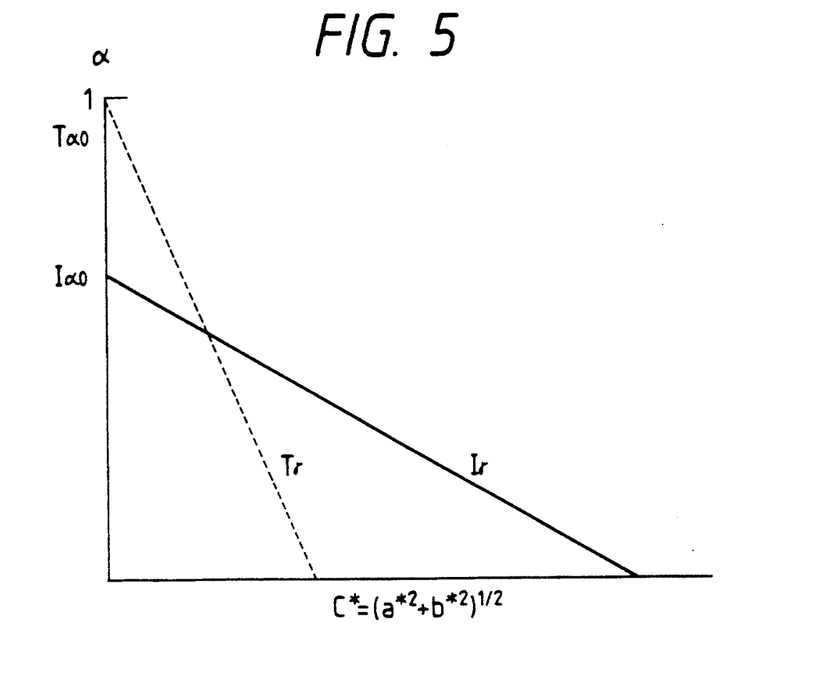
FIG. 5 is a graph showing a setting of a relationship between a black quantity adjusting coefficient $\alpha$ and a chroma signal $C^*$.

For example, the relationship between the black quantity adjusting coefficient $\alpha$ and the chroma signal $C^*$ (equation (6)) is set as shown in FIG. 5, where the solid line represents a relationship for a picture portion and the dashed line represents a relationship for a character portion. In general, for the reproduction of characters, smoothness of a character and easiness in discriminating its color are important factors. To reduce, as much as possible, the influences of a deviation of recording positions and multiple transfer performance in output devices to satisfy various requirements for character reproduction, it is desirable that a black character be reproduced using only black and a color character be processed so as not to include black. On the other hand, for the production of a picture, smooth reproduction of gradations and low graininess are required. In general, where the basic performances of output devices for the respective colors are the same, the graininess of a black image is worse than yellow, magenta and cyan images. To provide smooth reproduction of gradations, it is desired that the black quantity be varied as gently as possible.

For the above reasons, in this embodiment the relationship between the black quantity adjusting coefficient and the chroma signal $C^*$ is set as shown in FIG. 5.

$T_{a0}$, which is the black quantity adjusting coefficient for character portions when the input image is achromatic ($C^*=0$), is set at unity. That is, an input image judged as a black character image is reproduced using only black. Further, the rate of change $T_\gamma$ of the adjusting coefficient $\alpha$ with respect to the chroma signal $C^*$ is set at a large value so that black is not included in color character portions ($C^*\neq 0$), to improve the discrimination performance for color characters. As for picture portions, $\alpha$ is needed to be zero at a chroma point of a storage color such as a skin color, green of grass or blue of the sky, and the rate of change $I_\gamma$ of $\alpha$ with respect to $C^*$ is determined from the gradation reproduction performance of an image. $I_\alpha$ is automatically set from the above two requirements. As a result, the following general relationships hold for the character/picture (or text/image) coefficient sets $\{T_{a0}, T_\gamma\}$ and $\{I_{a0}, I_\gamma\}$:

$$T_{a0} > I_{a0}, \quad |T_\gamma| > |I_\gamma| \tag{7}$$

FIG. 6 shows another example of the full-black color conversion means 3 for determining the black quantity. The full-black color conversion means 3 receives the $\{L^* \ a^* \ b^*\}$ signals from the lightness/chromaticity separation means 2. The full-black color conversion means 3 consists of a table conversion section 3-11 for producing higher R bits of a black signal for the full-black reproduction from higher Q bits of the $\{L^*, a^*, b^*\}$ signals, and an interpolation section 3-12 for calculating lower R' bits of the black signal by interpolation.

The first section 3-11 has representative points of 32 levels for each of the $\{L^*, a^*, b^*\}$ signals, and stores the black quantity $K_{max}$, for the full-black reproduction at 8-bit accuracy. That is, the first section 3-11 is a table having three 5-bit addresses and an 8-bit output, and is implemented by one general purpose 256-kilobit ROM. The second section 3-5 performs interpolation between the lattice points of the table based on the lower 3 bits of the input $\{L^*, a^*, b^*\}$ signals and the black quantity $K_{max}$, provided from the first section 3-11, and outputs the 8-bit black quantity $K_{max}$.

Referring to FIG. 6, the operation of the full-black color conversion means 3 is described below. Each of the point-sequential image data $\{L^*_0, a^*_0, b^*_0\}$ are divided into higher 5 bits and lower 3 bits, and the higher 5 bits are input to the first section 3-11 as an address. If the address is written as $\{L, a, b\}$, the contents of $K_{max}$, of eight lattice points adjacent to the address are output from the table:

$P_0\{L, a, b\}$ $P_1\{L, a, b+1\}$ $P_2\{L, a+1, b\}$ $P_3\{L, a+1, b+1\}$ $P_4\{L+1, a, b\}$ $P_5\{L+1, a, b+1\}$ $P_6\{L+1, a+1, b\}$ $P_7\{L+1, a+1, b+1\}$ \hfill (8)

For example, the interpolation is performed as follows using the lower 3 bits of the image data $\{L^*_0, a^*_0, b^*_0\}$:

(1) Determining weight coefficients $W_i$ ($i=0, \ldots, 7$) for the respective apices $P_0$–$P_7$ of a partial space including the point $X\{L^*_0, a^*_0, b^*_0\}$ in the $\{L^*, a^*, b^*\}$ space.

(2) Calculating the black quantity $K_{max}$ corresponding to the point $X\{L^*_0, a^*_0, b^*_0\}$ by a linear calculation using the black quantities $K_{max}$, and the weight coefficients $W_i$ of the respective apices $P_0$–$P_7$.

Figure 7:
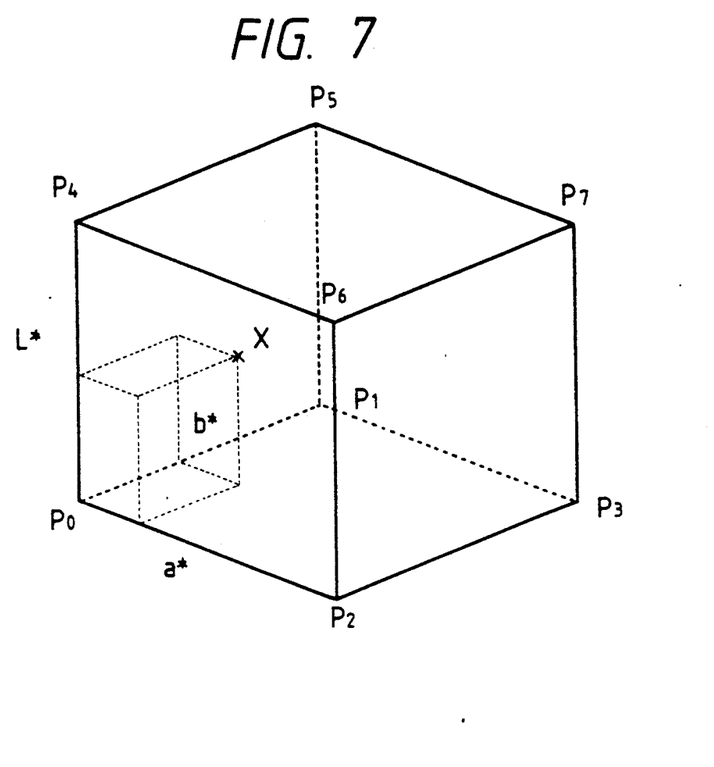
FIG. 7 illustrates an interpolating operation performed by the full-black color conversion means of FIG. 6.

There may be conceived various methods for calculating the weight coefficients $W_i$ in step (1). Among those methods, the simplest one is to calculate $W_i$ using the volume of a rectangular parallelepiped defined by the point X and an apex opposite to an apex whose $W_i$ is to be determined. More specifically, in FIG. 7, the weight coefficient $W_7$ for the apex $P_7$ is the volume of the rectangular parallelepiped defined by the point X and the apex $P_0$ divided by the volume of the partial space defined by the apices $P_0$–$P_7$. If the lower 3-bit data of the respective image data $\{L^*_0, a^*_0, b^*_0\}$ are written as $Ul$, $Ua$ and $Ub$, the weight coefficient $W_7$ for the apex $P_7$ is $Ul \cdot Ua \cdot Ub / 2^{2 \times 3}$. The weight coefficients for the respective apices are determined as follows ($U^*i$ is a 3-bit complement of $Ui$):

$W_0 = U^*l \cdot U^*a \cdot U^*b / 2^{4 \times 3}$ $W_1 = U^*l \cdot U^*a \cdot Ub / 2^{4 \times 3}$ $W_2 = U^*l \cdot Ua \cdot U^*b / 2^{4 \times 3}$ $W_3 = Ul \cdot Ua \cdot Ub / 2^{4 \times 3}$ $W_4 = Ul \cdot U^*a \cdot U^*b / 2^{4 \times 3}$ $W_5 = Ul \cdot U^*a \cdot Ub / 2^{4 \times 3}$ $W_6 = Ul \cdot Ua \cdot U^*b / 2^{4 \times 3}$ $W_7 = Ul \cdot Ua \cdot Ub / 2^{4 \times 3}$ \hfill (9)

In step (2), the black quantity $K_{max}$ ("X" in equation (10) below) is calculated as follows using the black quantities $K_{max}'$ ("P0"–"PT" in equation (10)) of the apices $P_0$–$P_7$ and the weight coefficients $W_0$–$W_T$:

$$X = \sum_{j=0}^{7} W_j P_j \tag{10}$$

The interpolation section 3-12 finally produces the 8-bit black quantity $K_{max}$ by performing, according to equation (10), the calculation of 16-bit accuracy using the 8-bit lattice data provided from the table conversion section 3-11 and the lower 3 bits of the input image data $\{L^*_0, a^*_0, b^*_0\}$ The black quantities $K_{max}'$ for the full-black reproduction (i.e., the reproduction using black and two of yellow, magenta and cyan) of the input image signals $\{L^*, a^*, b^*\}$ are stored, in advance, in the table of the table conversion section 3-11 according to a method described later. Therefore, the black quantity $K_{max}$ output from the full-black color conversion means 3 is the upper limit of the black quantity which can be set in faithfully reproducing the input image signals by the four colors of yellow, magenta, cyan and black.

With the above-described operations, a black quantity signal ENLk is output from the second black quantity adjusting means 4-2. The $\{L^*, a^*, b^*\}$ signals and the black quantity signal ENLk are input to a color conversion table 5-1, and an interpolation means 5-2 outputs a yellow signal ENLy, a magenta signal ENLm and a cyan signal ENLc. This process is described below in detail with reference to FIGS. 8 and 9.

Figure 8:
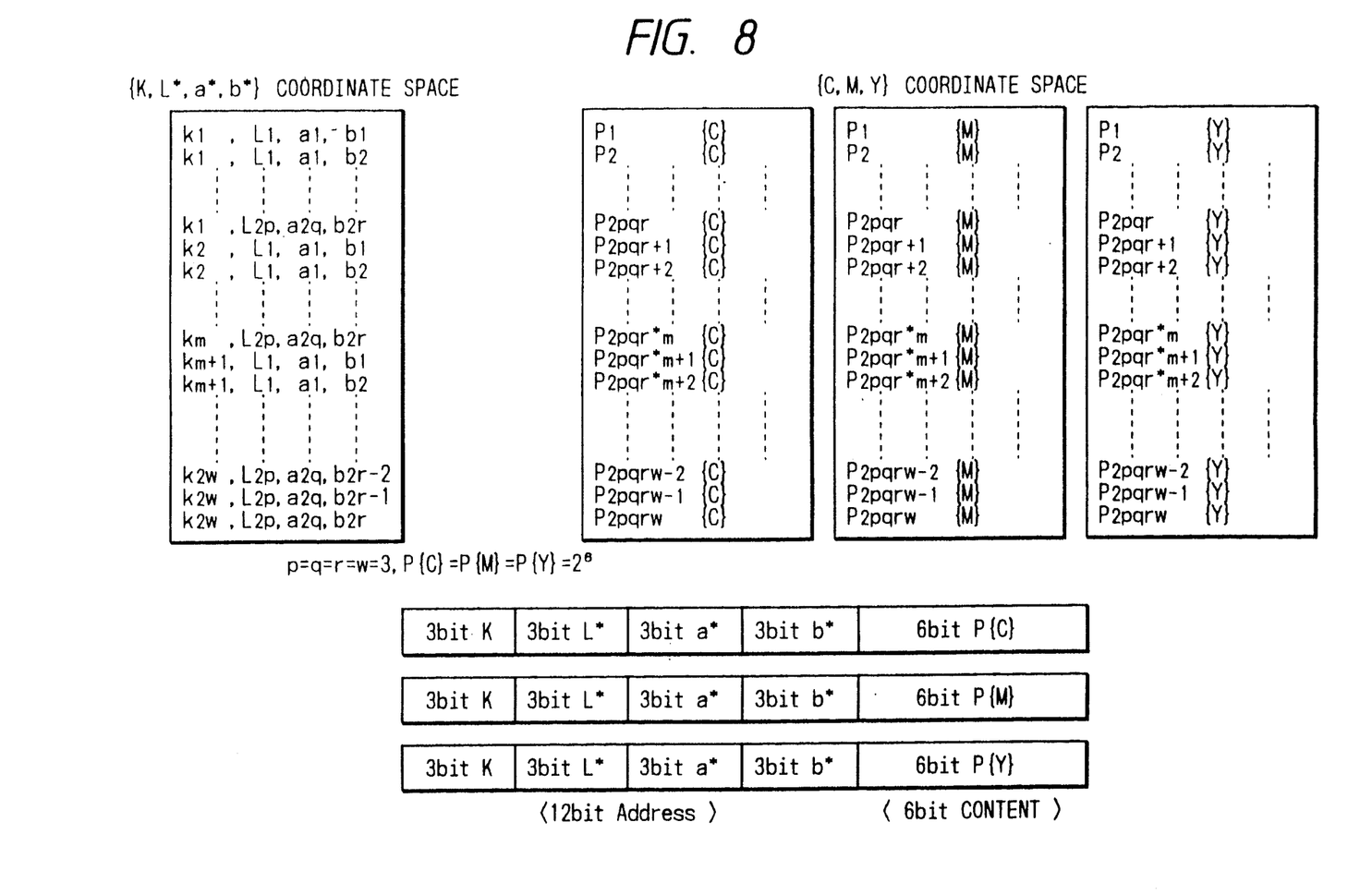
FIG. 8 illustrates details of a color conversion table.

The color conversion table 5-1 has representative points of 8 levels for each color, and an output color space of 8 bits for each of C, M, Y and K is divided by 4,096 (=$8^4$) representative points. The table 5-1 has {$L^*$, $a^*$, $b^*$, ENLk} as addresses and stores {ENLy, ENLm, ENLc} as contents. FIG. 8 shows an example of the table 5-1. The addresses, each having ENLk, $L^*$, $a^*$ and $b^*$ in this order, are arranged in the order of ranks. In each address, the contents {ENLy, ENLm, ENLc}, which have been calculated in advance according to a method described later, are stored as 6-bit data for each color. Three tables each having 12-bit addresses and 6-bit contents are provided which are implemented by general purpose 256-kilobit ROMs.

Each of the point-sequential image data {$ENLk_0$, $L^*_0$, $a^*_0$, $b^*_0$} is divided into higher 3 bits and lower 5 bits, and the higher 3 bits are input to the color conversion table 5-1 as an address. If the address is written as {k, L, a, b}, the contents {ENLy, ENLm, ENLc} of the following 16 points are output from the table 5-1:

$P_{00}${k, L, a, b}

$P_{01}${k, L, a, b+1}

$P_{02}${k, L, a+1, b}

$P_{03}${k, L, a+1, b+1}

$P_{04}${k, L+1, a, b}

$P_{05}${k, L+1, a, b+1}

$P_{06}${k, L+1, a+1, b}

$P_{07}${k, L+1, a+1, b+1}

$P_{10}${k+1, L, a, b}

$P_{11}${k+1, L, a, b+1}

$P_{12}${k+1, L, a+1, b}

$P_{13}${k+1, L, a+1, b+1}

$P_{14}${k+1, L+1, a, b}

$P_{15}${k+1, L+1, a, b+1}

$P_{16}${k+1, L+1, a+1, b}

$P_{17}${k+1, L+1, a+1, b+1}        (11)

Figure 9:
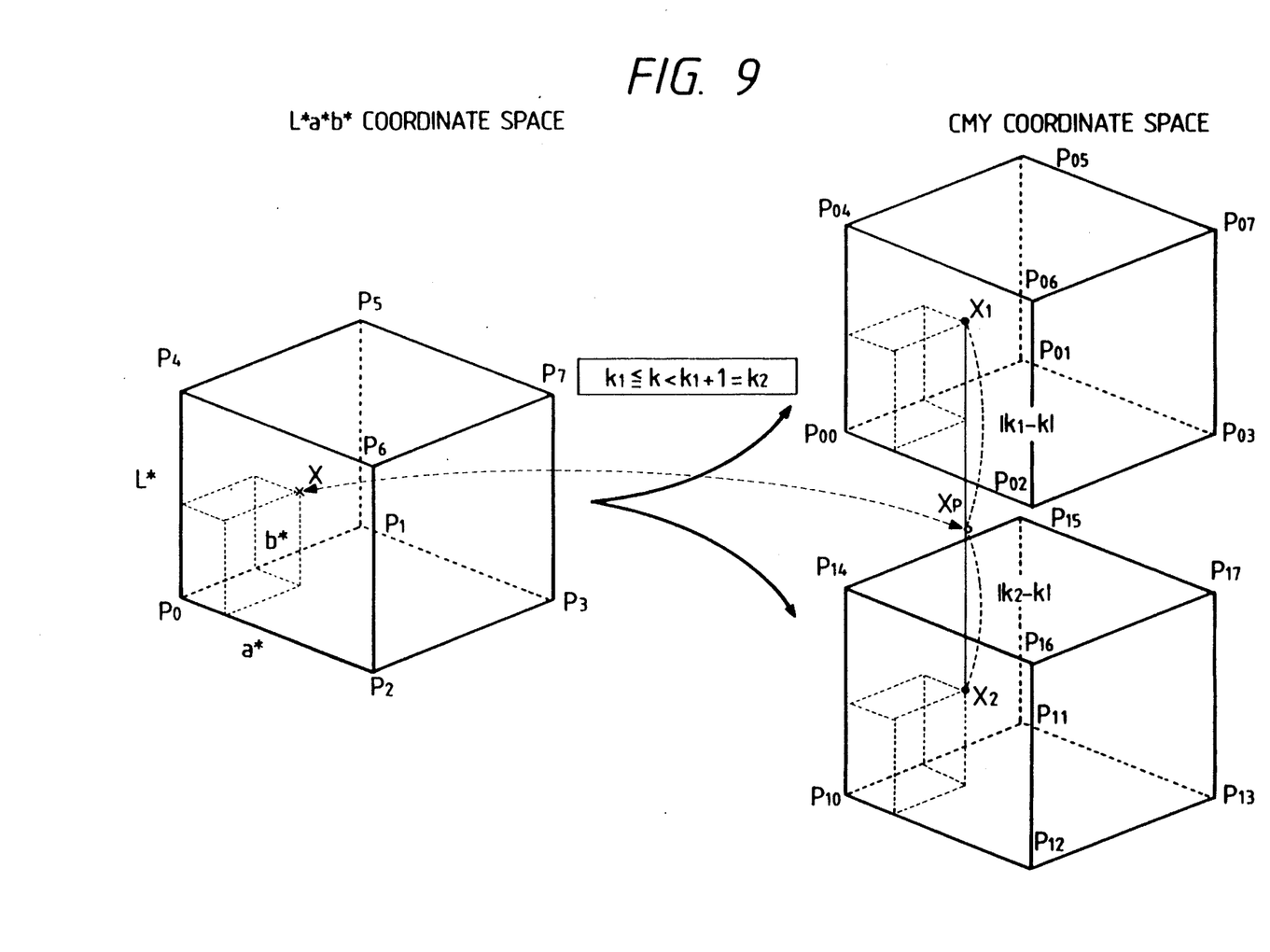
FIG. 9 illustrates an interpolating operation performed by an interpolation means.

FIG. 9 a corresponding relationship, for the 16 points selected from the color conversion table 5-1, between the {$L^*$, $a^*$, $b^*$} space and the {ENLy, ENLm, ENLc} space. A partial space in the {$L^*$, $a^*$, $b^*$} space having {k, L, a, b} as a representative point is mapped to two partial spaces in the {ENLy, ENLm, ENLc} space having $P_{00}${k, L, a, b} and $P_{10}${k+1, L, a, b} as representative points.

For example, the interpolation is performed as follows using the lower 5 bits of the image data {ENLk0, $L^*_0$, $a^*_0$, $b^*_0$}:

(1) Determining weight coefficients $W_i$ (i=0, ..., 7) for respective apices $P_0$–$P_7$ of a partial space including a point X{$L^*_0$, $a^*$ $b^*_0$} in the {$L^*$, $a^*$, $b^*$} space.

(2) Calculating correction points X1 and X2 by applying the weight coefficients $W_i$ for $P_0$–$P_7$ to two partial spaces (corresponding to k=$k_1$, $k_2$) of the {ENLy, ENLm, ENLc} space.

(3) Further performing interpolation between the correction points X1 and X2 using the lower 5 bits of ENLk0.

There may be conceived various methods for calculating the weight coefficients $W_i$ in step (1). Among those methods, the simplest one is to calculate $W_i$ using the volume of a rectangular parallelepiped defined by the point X and an apex opposite to an apex whose $W_i$ is to be determined. More specifically, in the {$L^*$, $a^*$, $b^*$} space of FIG. 9, the weight coefficient $W_7$ for the apex $P_7$ is the volume of the rectangular parallelepiped defined by the point X and the apex $P_0$ divided by the volume of the partial space defined by the apices $P_0$–$P_7$. If the lower 5-bit data of the respective image data {$ENLk_0$, $L^*_0$, $a^*_0$, $b^*_0$} are written as Uk, Ul, Ua and Ub, the weight coefficient $W_7$ for the apex $P_7$ is U1·Ua·Ub/$2^{6\times3}$ The weight coefficients for the respective apices are determined as follows ($U^*i$ is a 5-bit complement of Ui):

$$W_0 = U^*1 \cdot U^*a \cdot U^*b/2^{6\times3}$$

$$W_1 = U^*1 \cdot U^*a \cdot Ub/2^{6\times3}$$

$$W_2 = U^*1 \cdot Ua \cdot U^*b/2^{6\times3}$$

$$W_3 = U^*1 \cdot Ua \cdot Ub/2^{6\times3}$$

$$W_4 = U1 \cdot U^*a \cdot U^*b/2^{6\times3}$$

$$W_5 = U1 \cdot U^*a \cdot Ub/2^{6\times3}$$

$$W_6 = U1 \cdot Ua \cdot Ub/2^{6\times3}$$

$$W_7 = U1 \cdot Ua \cdot Ub/2^{6\times3} \quad (12)$$

In step (2), the correction points $X_i$ (i=1, 2) are calculated as follows using the values of $P_{i0}$–$P_{i7}$ (i=1, 2) corresponding to $P_0$–$P_7$ and the weight coefficients $W_0$–$W_7$:

$$X_i = \sum_{j=0}^{7} W_j P_{ij} \quad (i = 1,2) \quad (13)$$

Further, in step (3), the final correction point $X_p$ is calculated as follows using the values of the correction points $X_i$:

$$X_p = (UkX_1 + U^*kX_2)/2^6 \quad (14)$$

The interpolation means 5-2 performs steps (1)–(3) by means of a 16-bit multiplier and accumulator. The division in equations (12) and (14) is performed by a 6-bit shift operation. In this manner, the interpolation means 5-2 performs a calculation of 16-bit accuracy based on the 6-bit lattice data and the lower 5 bits of the image data {$ENLk_0$, $L^*_0$, $a^*_0$, $b^*_0$}, and finally produces {ENLy, ENLm, ENLc} data (each 8 bits). These data are provided, together with the black signal ENLk already calculated, to a recording device (not shown) via two-stage gradation correction means 6-1 and 6-2. The recording device reproduces the input color image in the predetermined order of colors.

It is not always necessary to use the gradation correction means 6-1 and 6-2, but they are effective in reducing the capacity of the color conversion table 5-1 and in improving the accuracy of the interpolation means 5-2. They are also effective in assuring that the conversion coefficients of the color conversion table 5-1 do not depend on the input/output characteristics of the recording device, i.e., in assuring the invention's generality when applied to the recording device. This is explained below in detail with reference to FIGS. 10 and 11.

Figure 10:
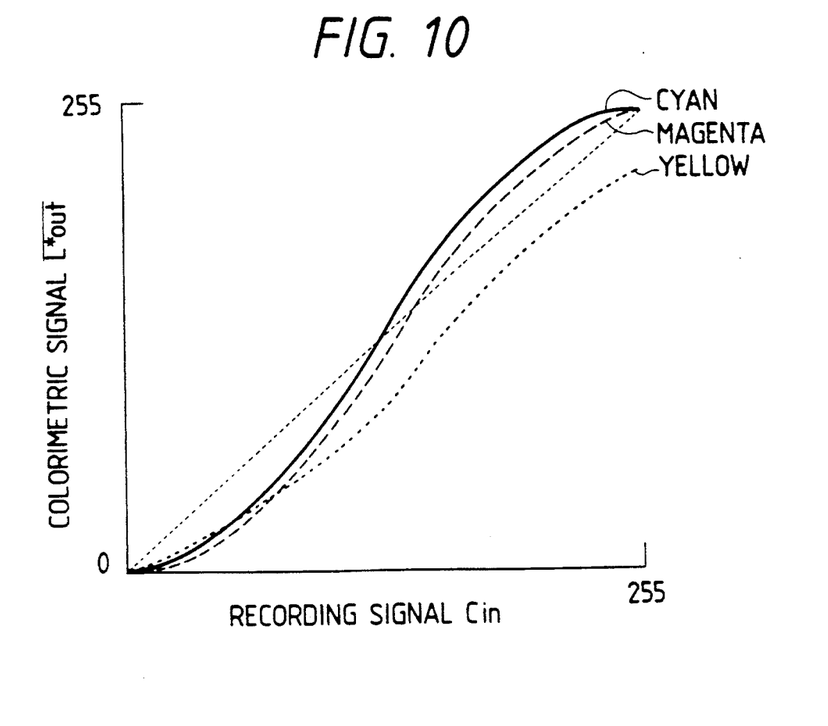
FIG. 10 is a graph showing input/output characteristics of a general recording device.

In general, the color conversion table 5-1 representing the corresponding relationship between the colorimetry space {L*, a*, b*} and the recording color space {C, M, Y} is obtained by making actual recording samples while uniformly varying recording signals within their variable ranges, measuring those samples with a colorimeter on the market, and producing a table by recursive correction. In this embodiment, this corresponds, for instance, to the case where 4,096 (=$8^4$) representative points are uniformly extracted from the output color space of the recording signals Yout, Mout, Cout and Kout (each 8 bits) of FIG. 1. However, in general, recording devices have nonlinear input/output characteristics as exemplified in FIG. 10. FIG. 10 shows general input/output characteristics in which the input is each of three 8-bit recording signals necessary for reproducing gray and the output is each of 8-bit-allocated colorimetric signals obtained by inverting the density of gray colorimetric values L*.

If the color conversion table 5-1 and the interpolation means 5-2 are implemented without considering the above-mentioned nonlinear characteristics, there occurs degeneracy in the {L*, a*, b*}-{C, M, Y} mapping of FIG. 9. That is, the prerequisites of FIG. 9, i.e., conservation of a local region shape through the mapping and linear interpolatability within a region are not satisfied. Further, C, M and Y values in the {C, M, Y} space do not have a constant relationship with respect to the gray axis (a*=b*=0), and the continuity is not conserved in the vicinity of gray. To avoid these problems, there may be conceived that the dividing points of the color-conversion table 5-1 are increased and smoothing is applied to the color conversion table 5-1 to compensate for the non-conservation of continuity. However, these measures will increase the memory size, which means an increase of hardware costs.

Figure 11:
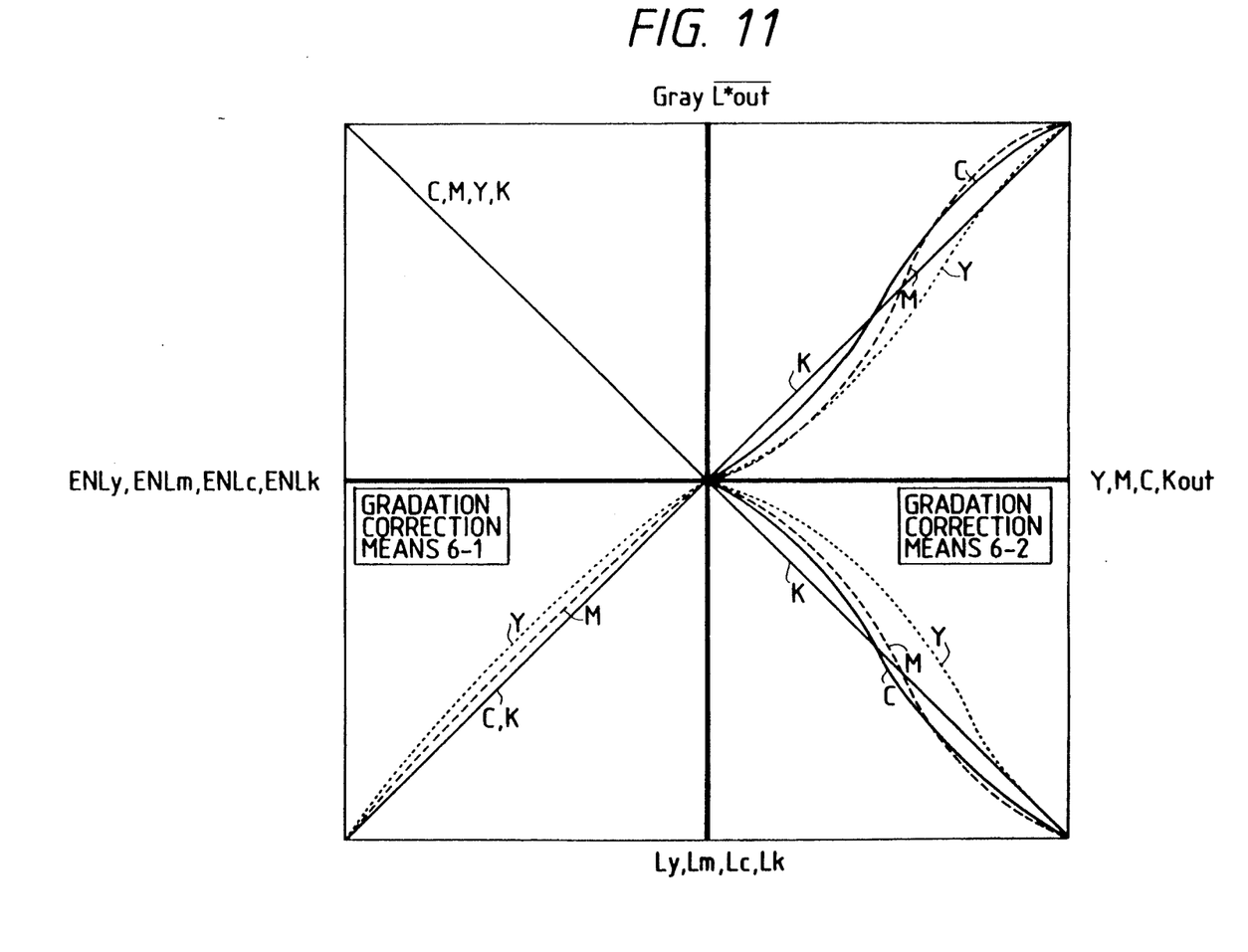
FIG. 11 is a graph showing input/output characteristics of two-stage gradation correction means.

In this invention, the gradation correction means 6-1 and 6-2 are provided to avoid the above problems. The gradation correction means 6-2 performs inverse correction of the FIG. 10 input/output characteristics of the recording device, that is, a conversion between {Ly, Lm, Lc, Lk} and {Yout, Mout, Cout, Kout} shown in the fourth quadrant of FIG. 11. The {Ly, Lm, Lc, Lk} signals are obtained by quantizing the respective gradation signals at the same intervals with respect to L*. This conversion compensates for the nonlinearity of the recording device. The gradation correction means 6-1 neutralize the gradation signals. The neutralization means normalization with respect to gray, and is generally called "equivalent neutral lightness conversion." In general, colorants of recording devices have undesired absorptions, and do not produce gray even if the Ly, Lm and Lc signals have the same value. As a countermeasure, a conversion between {ENLy, ENLm, ENLc} and {Ly, Lm, Lc} shown in the third quadrant of FIG. 11 is performed. The following relationship holds between the signals of the two spaces:

If a*=b*=0 and L*=p,
ENLy=ENLm=ENLc=p. (12)

That is, by virtue of the gradation correction means 6-1, gray vectors in the colorimetric space and the recording color space are defined linearly with respect to each other.

In the invention, monochromatic recording samples are prepared, before making the color conversion table 5-1, by varying the recording signals {Yout, Mout, Cout and Kout} within the 8-bit range. By measuring the samples with a colorimeter on the market, the {Ly, Lm, Lc, Lk}-{Yout, Mout, Cout, Kout} conversion of the gradation correction means 6-2 is determined. Further, recording samples in the vicinity of gray are prepared by a proper combination of the recording signals Ly, Lm and Lc. Based on measurements with a colorimeter, the {ENLy, ENLm, ENLc}-{Ly, Lm, Lc} conversion is determined.

Then, recording samples for making the color-conversion table 5-1 are prepared. The {ENLy, ENLm, ENLc} space is used as the recording color space, and sampling is performed at equal intervals in this space. Actual recording signals are obtained through the conversion by the gradation correction means 6-1 and 6-2, and recording samples are prepared. Based on measurements with a colorimeter, corresponding points are obtained in the {L*, a*, b*} space and a table is finally produced.

By virtue of constructing the color conversion table 5-1 through the gradation correction means 6-1 and 6-2, the linearity of the mapping defined by the table 5-1 can be improved, the capacity of the table 5-1 can be reduced, and the accuracy of the interpolation means 5-2 can be improved.

As described above, the black addition quantity is first determined on the uniform color space considering image improvement factors other than the color reproduction within the black quantity setting range that is determined with the faithful color reproduction as a prerequisite. Then, the three output color signals are determined so as to satisfy the faithful color reproduction with respect to the black addition quantity thus determined. Therefore, the faithful color reproduction and the image quality improvements other than the color reproduction are realized at the same time. Further, since every processing step is device-independent and is performed using iso-perceptive lightness/chromaticity separation signals that well match the human perception, the invention can be applied to a variety of image recording devices irrespective of their types and necessary adjustments are performed in a manner compatible with the human perception. Having the above advantages, the color image processing apparatus of the invention can be applied suitably to a wide variety of apparatuses such as a printing scanner, video printer, digital color copier and a color-proof system.

What is claimed is:

1. A color image processing method for generating from input color separation signals of a first set of three colors representing an input image, output color signals of black and a second set of three colors, the method comprising the steps of:

converting the input color separation signals of the first set of three colors to uniform color signals of three variables on a uniform color space;

determining a first black quantity to be used for substantially converting the uniform color signals of three variables to color signals of black and two colors of the first set of three colors, the first black quantity being a maximum black quantity of the output black signal;

determining a second black quantity based on the first black quantity and a chroma signal obtained from the uniform color signals of three variables, the second black quantity being actually used in the output black signal; and determining color quantities of the respective output color signals of the second set of three colors based on the uniform color signals of three variables, and the second black quantity.

2. The color image processing method of claim 1, further comprising:

correcting the output color signals nonlinearly in accordance with a gradation characteristic of an image output device.

3. A color image processing method for generating from input color separation signals of a first set of three colors representing an input image, output color signals of black and a second set of three colors, the method comprising the steps of:

converting the input color separation signals of the first set of three colors to uniform color signals of three variables on a uniform color space;

determining a first black quantity to be used for substantially converting the uniform color signals of three variables to color signals of black and two colors of the first set of three colors, the first black quantity being a maximum black quantity of the output black signal;

determining a second black quantity based on the first black quantity, a chroma signal obtained from the uniform color signals of three variables, and adjustment information including a mode of the input image and a representative color, the second black quantity being actually used in the output black signal; and determining color quantities of the respective output color signals of the second set of three colors based on the uniform color signals of three variables and the second black quantity.

4. The color image processing method of claim 3, wherein the second black quantity K is determined such that $K = \alpha \cdot K_{max}$, where $K_{max}$ is the first black quantity and $\alpha$ is an adjusting coefficient ranging from 0 to 1 and determined from the chroma signal and the adjustment information.

5. The color image processing method of claim 4, wherein $\alpha$ is determined such that $\alpha = \alpha_0 + \gamma \cdot C^*$, where $\alpha_0$ and $\gamma$ are coefficients preset for the adjustment information and $C^*$ is the chroma signal.

6. The color image processing method of claim 3, wherein the mode of the input image is judged based on differences in lightness between a pixel under attention and pixels adjacent thereto.

7. A color image processing apparatus for generating from input color separation signals of a first set of three colors representing an input image, output color signals of black and a second set of three colors the method comprising:

means for converting the input color separation signals of the first set of three colors to uniform color signals of three variables on a uniform color space;

means for determining a first black quantity to be used for substantially converting the uniform color signals of three variables to color signals of black and two colors of the first set of three colors, the first black quantity being a maximum black quantity of the output black signal;

means for determining a second black quantity based on the first black quantity and a chroma signal obtained from the uniform color signals of three variables, the second black quantity being actually used in the output black signal; and means for determining color quantities of the respective output color signals of the second set of three colors based on the uniform color signals of three variables and the second black quantity.

8. The color image processing apparatus of claim 7, further comprising means for correcting the output color signals nonlinearly in accordance with a gradation characteristic of an image output device.

9. The color image processing apparatus of claim 7, wherein the first black quantity determining means comprises means for converting, in a parallel manner, the uniform color signals of three variables to possible combinations of the color signals of black and two colors of the first set of three colors using sets of preset color conversion coefficients corresponding to divided chromatically regions, and means for selecting one of the possible combinations having positive color signals.

10. The color image processing apparatus of claim 7, wherein the first black quantity determining means comprises a table for indicating higher bits of the first black quantity corresponding to higher bits of the uniform color signals, and means for determining the first black quantity by interpolation based on the higher bits of the first black quantity and lower bits of the uniform color signals.

11. A color image processing apparatus for generating from input color separation signals of a first set of three colors representing an input image, output color signals of black and a second set of three colors the apparatus comprising:

means for converting the input color separation signals of the first set of three colors to uniform color signals of three variables on a uniform color space;

means for determining a first black quantity to be used for substantially converting the uniform color signals of three variables to color signals of black and two colors of the first set of three colors, the first black quantity being a maximum black quantity of the output black signal;

means for determining a second black quantity based on the first black quantity, a chroma signal obtained from the uniform color signals of three variable, and adjustment information including a mode of the input image and a representative color, the second black quantity being actually used in the output black signal; and means for determining color quantities of the respective output color signals of the second set of three colors based on the uniform color signals of three variables and the second black quantity.

12. The color image processing apparatus of claim 11, 2 wherein the second black quantity K is determined such that $K = \alpha \cdot K_{max}$, where $K_{max}$ is the first black quantity and $\alpha$ is an adjusting coefficient ranging from 0 to 1 and determined from the chroma signal and the adjustment information.

13. The color image processing apparatus of claim 12, wherein $\alpha$ is determined such that $\alpha = \alpha_0 + \gamma \cdot C^*$, where $\alpha_0$ and $\gamma$ are coefficients preset for the adjustment information and $C^*$ is the chroma signal.

14. The color image processing apparatus of claim 11, wherein the second black quantity determining means comprises means for Judging the mode of the input image based on differences in lightness between a pixel under attention and pixels adjacent thereto.

* * * * *

UNITED STATES PATENT AND TRADEMARK OFFICE
CERTIFICATE OF CORRECTION

PATENT NO. : 5,331,440
DATED : July 19, 1994
INVENTOR(S) : Shinji KITA et al.

It is certified that error appears in the above-indentified patent and that said Letters Patent is hereby corrected as shown below:

Claim 11, column 16, lines 44-45, "variable" should read --variables--.

Claim 12, column 16, line 54, delete "2"

Claim 14, column 16, line 65, "Judging" should read --judging--.

Signed and Sealed this

Twenty-first Day of March, 1995

Attest:

BRUCE LEHMAN

Attesting Officer     Commissioner of Patents and Trademarks